United States Patent Office 3,492,312
Patented Jan. 27, 1970

3,492,312
MANUFACTURE OF 6,7,8,9,10,10-HEXAHALO-1,5,5α,6,9,9α - HEXAHYDRO - 6,9-METHANO-2,4,3-BENZODIOXATHIEPIN-3-OXIDE
Laurence S. Little, Niagara Falls, and Bernard A. Isroe, Tonawanda, N.Y., assignors to Hooker Chemical Corporation, Niagara Falls, N.Y., a corporation of New York
No Drawing. Continuation-in-part of application Ser. No. 251,472, Jan. 15, 1963. This application May 31, 1966, Ser. No. 553,685
Int. Cl. C07d 89/20
U.S. Cl. 260—327                13 Claims

ABSTRACT OF THE DISCLOSURE

There is provided a novel process for the production of 6,7,8,9,10,10 - hexahalo - 1,5,5a,6,9a - hexahydro - 6,9-methano-2,4,3-benzodioxathiepin-3-oxide. Said process is comprised of the steps of:
(a) treating hexahalocyclopentadiene which contains impurities resulting from the manufacture of said hexahalocyclopentadiene with a purifying agent and maintaining contact of said agent with said hexahalocyclopentadiene for a period of time sufficient to cause purification of said hexahalocyclopentadiene;
(b) separating the treated hexahalocyclopentadiene from the purifying agent;
(c) reacting the treated hexahalocyclopentadiene with cis-2-butenediol-1,4 whereby 1,4,5,6,7,7-hexahalo-2,3-bis(hydroxymethyl)bicyclo-(2.2.1)-heptene-5 is produced; and
(d) reacting said 1,4,5,6,7,7-hexahalo-1,3-bis(hydroxymethyl)-bicyclo-(2.2.1)-heptene-5 with thionyl halide.
The hexachloro- compound prepared via the process of this invention is a commercial pesticide.

---

This is a continuation-in-part of parent application Ser. No. 251,472, filed Jan. 15, 1963 now matured to U.S. 3,258,499.

This invention relates to an improved process for the manufacture of benzodioxathiepin oxide. More particularly, this invention is concerned with the production of 6,7,8,9,10,10 - hexahalo - 1,5,5a,6,9,9a - hexahydro - 6,9-methano-2,4,3-benzodioxathiepin-3-oxide, especially the chlorinated analog thereof which is known as and will be hereinafter referred to as "endosulfan."

The preparation of endosulfan and endosulfan analogs is illustrated by the following equations:

(1)
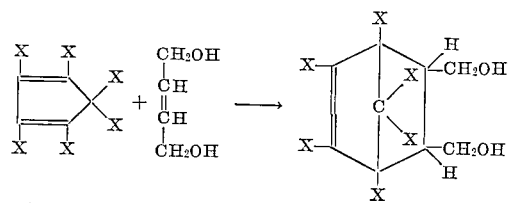

Hexahalocyclopentadiene + Cis-2-butenediol-1,4 → 1,4,5,6,7,7 - hexahalo - 2,3 - bis(hydroxymethyl) - bicyclo - (2.2.1)-Heptene-5

(2)
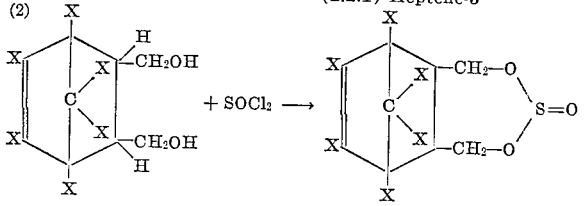

+ SOCl₂ →

Endosulfan - type Compounds (6,7,8,9,10,10 - hexahalo-1,5, 5a,6,9,9a - hexahydro - 6,9-methono - 2,4,2 - benzodioxathiepin-3-oxide)

wherein X is selected from the group consisting of fluorine, chlorine, bromine, and iodine. The starting material hexacyclopentadiene, contains various impurities, among which are trace amounts of iron, acid halides, metal halides, hydrogen halides and halogens. The Diels-Alder adduct prepared from hexacyclopentadiene, sometimes discolored, varies in color from white to a dark brown, indicating the presence of impurities. The endosulfan-type compound prepared from an impure adduct is of unsatisfactory purity and its effectiveness as a pesticide is adversely affected. This impure product is obtained even when the hexahalocyclopentadiene does not show any evidence of discloration, for the presence of undesirable impurities in the hexahalocyclopentadiene is not readily determinable, and one cannot determine from visual examination which hexahalocyclopentadiene will produce the discolored Diels-Alder adduct.

In preparing hexacyclopentadiene for use in reactions (1) and (2) it has been the practice to treat it with a mixed magnesium oxide. In some instances this process has proved to be reasonably effective in the removal of impurities. However the results of this process are not accurately reproducible, and it is not readily possible to predict when the removal of impurities has been effected. As a result, it has been found that in over 50% of the reactions conducted under this process the endosulfan-type compound produced does not meet purity specifications.

It is the object of this invention to provide a process whereby hexahalocyclopentadiene of a constant high purity is employed to prepare endosulfan-type compounds which are 98 to 100% pure.

In accordance with this invention there is provided a process for the production of 6,7,8,9,10,10-hexahalo-1,5,-5a,6,9,9a - hexahydro - 6, 9 - methano - 2,4,3 - benzodioxathiepin-3-oxide of high purity, which comprises treating hexahalocyclopentadiene which contains impurities resulting from the manufacture of said hexahalocyclopentadiene with purifying agent and maintaining contact of said agent with said hexahalocyclopentadiene for a period of time sufficient to cause purification of said hexahalocyclopentadiene, separating the treated hexahalocyclopentadiene from the purifying agent, reacting the treated hexahalocyclopentadiene with cis-2-butenediol-1,4- whereby 1,4,5,6,7,7-hexahalo-2,3-bis(hydroxymethyl)bicyclo 2.2.1)-heptene-5 is produced, and reacting said 1,4,5,6, 7,7 - hexahalo - 2,3 - bis(hydroxymethyl) - bicyclo- (2.2.1)heptene-5 with thionyl halide.

To facilitate comprehension, this specification is divided into three parts; part I describes the making of the impure hexahalocyclopentadiene; Part II describes the purification of the hexahalocyclopentadiene; and Part III describes the synthesis of endosulfan and endosulfan analogs from the purified hexahalocyclopentadiene

PART I

Production of hexahalocyclopentadiene

The hexahalocyclopentadiene is prepared by reacting an aliphatic hydrocarbon containing at least 5 carbon atoms or an alicyclic hydrocarbon containing 5 carbon atoms in the ring, or the halogenated derivatives of said compounds, with halogen at a temperature of from about 350 to about 700 degrees centigrade, preferably at a temperature of about 450 to about 600 degrees centigrade. Because the rate of thermal decomposition of hexahalocyclopentadiene is a function of temperature and time, good reactions may even be expected at a reaction temperature in excess of 700 degrees centigrade without causing a significant amount of thermal decomposition, when the reaction time is short enough.

The 5 carbon atom alicyclic hydrocarbons having the 5 carbon atoms in the ring, and the 5 carbon atom aliphatic hydrocarbons wherein the number of carbon atoms in the longest straight chain is 4 to 5 are particularly suitable for the preparation of hexahalocyclopentadiene in the aforementioned manner.

If one uses a polyhalo compound as a starting material, it is desirable that it have a specific gravity of from about 1.6 to 1.7, and that about 5 to 8 moles of halogen be used for each mole. Suitable starting materials include, e.g., n-pentane, isopentane, neopentane, the mono-, di-, tri-, tetra-, penta-, hexa-, hepta-, and octahalogenated derivatives thereof, and the like. It is preferred to use a mixture of polychloropentanes with an average formula of about $C_5H_5Cl_7$, which mixture contains the monchlorinated adduct, the octachlorinated adduct, and every intermediate species.

PART II

Purification of hexahalocyclopentadiene

The hexahalocyclopentadiene prepared is contacted with a purifying agent, the amount of agent added and time during which said contact is maintained being at least sufficient to give the desired purification. Amounts in the range of 10 to 100 moles of hexahalocyclopentadiene and 0.1 to 1 moles of purifying agent are effective, although it is preferred to work with from about 40–60 moles of hexahalocyclopentadiene and from about 0.2 to 0.3 mole of purifying agent. It is to be appreciated that gerater or lesser amounts can be utilized without departing from the scope of this invention.

The inventors do not know all of the impurities which exist in the hexalocyclopentadiene produced as per Part I, nor have they established the mechanism by which purification of said hexahalocyclopentadiene is effected. It is known however that the impurities include, among other things, trace amounts of iron, acid halides, metal halides, hydrogen halides, and halogens. It is further known that compounds to be effective as purifying agents of said impure hexahalocyclopentadiene must have a pH in a one normal aqueous solution of from 8 to 12 and must be good iron sequestrants.

Thus, alkali metal carbonates are the preferred class of purifying agents, exhibiting both of the aforementioned properties. Other compounds which exhibit said propertiess, such as alkali metal phosphates, alkali metal bicarbonates, and the like, may also be used as purifying agents.

One should, however, avoid the use of alkali metal hydroxides as purifying agents. In the first place, they are too reactive and tend to decompose the hexahalocyclopentadiene; in the second place, they are relatively poor sequestrants, and endosulfan-type compounds prepared from hexahalocyclopentadiene purified with alkali metal hydroxides exhibit poor purity characteristics. Similarly, metal oxides are unsatisfactory.

Generally it has been found that the reaction mixture can be reacted over a wide range of temperatures with good purification of hexahalocyclopentadiene being obtained. Accordingly, in the practice of the present invention, the purification of hexahalocyclopentadiene may be accomplished without any additional heating or cooling of the hexahalocyclopentadiene, either prior to or during the purification process. The process of the present invention is effected at a temperature of from 10 to 230 degrees centigrade and is preferably accomplished at room temperature, 20–25 degrees centigrade. It will be appreciated that when lower temperatures are used reaction time will be increased. Further, it will be realized that higher temperatures may be used which would not be detrimental to the purification process.

Pressures employed in the purification step are conveniently atmospheric, although super- or sub-atmospheric pressures may be employed.

In a preferred embodiment of this step, purification is accomplished by contacting hexahalocyclopentadiene, preferably hexachlorocyclopentadiene, with an alkali metal carbonate, preferably sodium carbonate, and maintaining contact of the alkali metal carbonate with the hexahalocyclopentadiene being purified for a period of time sufficient to cause purification. The mixture is agitated during the purification and the hexahalocyclopentadiene is separated from the impurities by filtration. Preferably, in order to complete a more rapid reaction of the hexahalocyclopentadiene with the alkali metal salt, the materials are admixed prior to agitation.

Generally, it has been found that the time to effect purification is from about 15 minutes to 1 hour; however greater or lesser periods of time can be used.

Illustrative examples of alkali metal salts which act as purifying agents include the carbonates of sodium, potassium, lithium, cesium, and rubidium; the phosphates of the aforementioned metals; the bicarbonates of the aforementioned metals; and the like.

Once the purifying agent and hexahalocyclopentadiene have been intimately admixed for the desired time period, hereinbefore described, separation of the hexahalocyclopentadiene from other substituents is effected. Preferably, separation is by filtration, although other methods, such as centrifuging, may be employed. Additionally, materials may be added with the alkali metal purifying agent which will aid the separation, including filter aids such as diatomite (sold under the trade name of "Dicalite"), it being clear that one should not employ a filter aid which would have a detrimental effect on the hexahalocyclopentadiene or the purification thereof.

After the impure hexahalocyclopentadiene is purified according to the aforementioned procedure, it is subjected to the reactions of Part III, whereby endosulfan-type compounds are produced which are from 98 to 100% pure.

PART III

Production of endosulfan-type compounds with the purified hexahalocyclopentadiene To the purified hexahalocyclopentadiene is added cis-2-butenediol-1,4, a dienophile, to form the Diels-Alder adduct 1,4,5,6,7,7-hexachloro-2,3-bis(hydroxymethyl)bicyclo-(2.2.1)heptene-5. The addition should preferably take place over a period of time ranging from one-quarter to one-half of the total reaction time of the hexahalocyclopentadiene with the butenediol; however improved yields may be obtained when the time of addition of the butenediol varies between one-tenth of the total reaction time to all of the total reaction time.

A solvent may or may not be employed during said addition. If one is used it should be inert with respect to the reactants and the reaction products, and should have a sufficiently high boiling point to allow for reaction at elevated temperatures without necessitating the application of superatmospheric pressure. The solvents which may be used, for example, include dioxane, epichlorohydrin, monochlorobenzene, dichlorobenzene, chlorobenzene, n-butanol, toluene, xylene, benzene, butyl Cellosolve, methyl Cellosolve, methyl isobutyl ketone, diethyl carbitol, tertiary butyl alcohol, benzyl alcohol, normal amyl alcohol, tertiary amyl alcohol, acetonitrile, isobutyronitrile, and the like.

Preferably, during the addition of the butenediol to the hexahalocyclopentadiene, the latter compound will be in a slight stoichiometric excess, e.g., 0–100% excess.

Reaction temperatures employed are greater than about seventy-five degrees centigrade, preferably within the range of 125–250 degrees centigrade. In general, the reaction may be run at reflux temperatures, thereby obviating the need for a temperature regulating device.

After the reaction is completed, the reaction mixture is cooled to a temperature of about 25 degrees centigrade, at which point the Diels-Alder adduct crystallizes and precipitates out of the solution.

The Diels-Alder adduct is recovered by filtration. To said adduct is added thionyl chloride. For this addition a solvent should be employed which has a sufficiently high boiling point to allow for reaction at elevated temperatures without necessitating the application of super-atmospheric pressure, in which solvent the endosulfan-type compound product but not the Diels-Alder adduct reactant should be soluble. Suitable solvents include thionyl chloride, methylene chloride, chloroform, carbon tetrachloride, benzene, toluene, xylene, and the like. The amount of solvent can be varied over a wide range without affecting the yields, but generally from 0.5 to 2 cubic centimeters of solvent per gram of Diels-Alder adduct should be used.

The thionyl chloride is added to the Diels-Alder adduct, which is in the presence of the solvent in which it is insoluble. As the endosulfan-type compound is formed, it immediately goes into solution.

During the addition of the thionyl chloride to the Diels-Alder adduct the former compound should be in a slight stoichiometric excess, e.g., from 10–100% excess, best results being obtainable when the thionyl chloride is in a 100% excess.

The reaction temperature should be slightly above room temperature, preferably between about 40 degrees centigrade and the reflux temperature of the reaction mixture, this upper limit usually being determined by the boiling point of the solvent used; e.g., if toluene is used as a solvent, the mixture will reflux at about 125 degrees centigrade, several degrees above the boiling point of toluene.

The reaction time is not critical, and may be varied depending upon the reaction temperature used and the completeness of reaction desired.

The cyclic sulfite obtained may be isolated from solution by distilling off the solvent by procedures known in the art. The product thus obtained may be cast or flaked; it is of high purity, but one may recrystallize it or otherwise even further purify it.

If desired, both reactions (1) and (2) may be run simultaneously if the thionyl chloride is added directly to the hexahalocyclopentadienebutenediol reaction mixture.

In order that those skilled in the art may better understand the present invention and the manner in which it may be practiced, the following specific examples are given. All parts are by weight, and all temperatures are in degrees centigrade, unless otherwise indicated.

EXAMPLE 1

4.500 pounds of n-pentane and 44,300 pounds of chlorine were fed into a "heel" of polychloropentanes which had an average composition of $C_5H_{4.7}Cl_{7.3}$, and the pentane, in the presence of chlorine, was subjected to ultraviolet radiation and photochlorinated in accordance with the method of U.S. Patent No. 2,473,161. 19,770 pounds of polychloropentanes with an average formula of $C_5H_{4.7}Cl_{7.3}$ were obtained, as were 10,420 pounds of chlorine which were not consumed in the photochlorination reaction.

Said polychloropentanes and said chlorine were further reacted under the conditions of U.S. Patent 2,509,160, Example 1, to yield 18,410 pounds of a crude mixture of hexachlorocyclopentadiene and other chlorinated organic compounds, which mixture had the following composition:

| | Percent |
|---|---|
| $C_2Cl_4$ | 4.0 |
| $C_5HCl_7$ | 1.4 |
| $C_4Cl_6$ | 1.7 |
| $C_5Cl_6$ | 89.0 |
| $C_5Cl_8$ | 2.3 |
| $C_5Cl_6$ | 1.3 |

Said mixture was vacuum distilled, and 15,000 parts of impure hexachlorocyclopentadiene were recovered.

40 pounds of sodium carbonate and ten pounds of dicalite were mixed with the impure hexachlorocyclopentadiene, and the mixture, at room temperature, was stirred for 30 minutes. The mixture was then filtered and pumped into a reactor, after which 265 pounds of epichlorohydrin were added to the reaction mixture. The reaction mixture was heated to a temperature of 152 degrees centigrade, and 281 gallons of cis-2-butenediol-1,4 were added over a period of about 4.75 hours, during which addition the reaction mixture was agitated. The reaction mixture was thereafter held at 152 degrees centigrade for 4 more hours, and agitated. Thereafter, the reaction mixture was cooled to about 25 degrees centigrade, and the Diels-Alder adduct crystals were recovered. These crystals were then placed in 5,250 pounds of toluene, and 3,600 pounds of thionyl chloride were added to this mixture. The reaction mixture was agitated and maintained at a temperature of 100 degrees centigrade. Endosulfan was recovered which, on analysis, was discovered to be 98.8% pure.

EXAMPLES 2–4

The procedure of Example 1 was used, with the following results:

Example 2—Endosulfan of 99.2% purity obtained
Example 3—Endosulfan of 98.4% purity obtained
Example 4—Endosulfan of 98.2% purity obtained

EXAMPLE 5

The procedure of Example 1 was used with the exception that 40 pounds of magnesium oxide ("Maglite") were used in place of the sodium carbonate. Analysis of the endosulfan so prepared showed a purity of 83.1%.

A comparison of the results obtained in Examples 1–4 and Example 5 clearly shows the superior results obtained by the process of the present invention.

While there have been described various embodiments of the invention, the methods and elements described are not intended to be understood as limiting the scope of the invention as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principles may be utilized.

What is claimed is:

1. A process for the preparation of 6,7,8,9,10,10-hexahalo - 1,5,5a,6,9,9a - hexahydro - 6,9 - methano - 2,4,3-benzodioxathiepin-3-oxide of high purity which comprises:
   (a) purifying hexahalocyclopentadiene which contains such impurities as result from the manufacture of hexahalocyclopentadiene by reacting a compound selected from the group consisting of aliphatic hydrocarbons of at least 5 carbon atoms, alicyclic hydrocarbons containing 5 carbon atoms in the ring, and halogenated derivatives of such compounds, with halogen at a temperature of between about 350 and 700 degrees centigrade, wherein said purifying agent is selected from the group consisting of alkali metal carbonates, and wherein said impure hexahalocyclopentadiene is contacted with said purifying agent for a period of time sufficient to cause purification;
   (b) separating the treated hexahalocyclopentadiene from the purifying agent;
   (c) reacting the treated hexahalocyclopentandiene with cis-2-butenediol-1,4 whereby 1,4,5,6,7,7 - hexahalo-2,3 - bis(hydroxymethyl) - bicyclo-(2.2.1)-heptene-5 is produced; and
   (d) reacting said 1,4,5,6,7,7 - hexahalo - 2,3 - bis(hydroxymethyl) - bicyclo - (2.2.1) - heptene-5 with thionyl halide.

2. The process of claim 1, wherein the "halogenated derivatives" and "halogen" referred to are chlorides and chlorine, whereby the hexahalocyclopentadiene produced is hexachlorocyclopentadiene.

3. The process of claim 2, wherein from about 10 to about 100 parts of hexachlorocyclopentadiene is treated with from about 0.1 to 1 part of purifying agent.

4. The process of claim 3, wherein the purifying agent is sodium carbonate.

5. The process of claim 4, wherein from about 40 to 60 parts of hexachlorocyclopentadiene is treated with from about 0.2 to 0.3 parts of sodium carbonate.

6. The process of claim 5, wherein cis-2-butenediol-1,4 is added to the hexachlorocyclopentadiene, and the time of addition ranges from 10 percent to 100 percent of the total reaction time.

7. The process of claim 6, wherein during the reaction of cis-2-butenediol-1,4 with hexachlorocyclopentadiene, the latter is in slight stoichiometric excess.

8. The process of claim 7, wherein during the reaction of cis-2-butendiol-1,4 with hexachlorocyclopentadiene the reaction is run at about 125 to about 250 degrees centigrade.

9. The reaction of claim 8, wherein during the thionyl chloride-1,4,5,6,7,7-hexahalo - 2,3 - bis(hydroxymethyl)-bicyclo - (2.2.1) - heptene-5 reaction the former compound is in about 10 to 100 percent excess.

10. The process of claim 2 wherein the purifying agent is an alkali metal carbonate.

11. The process of claim 13, wherein the hexachlorocyclopentadiene manufacturing reaction is conducted at a temperature of about 450 to about 600 degrees centigrade.

12. The process of claim 11 wherein the hexachlorocyclopentadiene is prepared from a mixture of polychloropentanes with an average formula of about $C_5H_5Cl_7$ and with a sepcific gravity of from about 1.6 to about 1.7.

13. The process of claim 12, wherein sodium carbonate is contacted with the impure hexachlorocyclopentadiene for from about 15 minutes to about 1 hour.

References Cited

UNITED STATES PATENTS

| | | | |
|---|---|---|---|
| 2,983,732 | 5/1961 | Geering et al. | 260—327 |
| 3,258,499 | 6/1966 | Little et al. | 260—648 |

JAMES A. PATTEN, Primary Examiner

PO-1050
(5/69)

UNITED STATES PATENT OFFICE
CERTIFICATE OF CORRECTION

Patent No. 3,492,312    Dated January 27, 1970

Inventor(s) L. S. Little, Bernard A. Isroe.

It is certified that error appears in the above-identified patent and that said Letters Patent are hereby corrected as shown below:

Column 1, line 33, delete "-hexahalo-1,3-bis(" and insert -- -hexahalo-2,3-bis( --; Column 1, line 73, delete "methono-2,4,2-benzo" and insert -- methono-2,4,3-benzo --; Column 8, Claim 11, line 3, delete "process of Claim 13" and insert -- process of claim 9 --.

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents